(No Model.)
O. E. WINGER.
WINDMILL.
No. 293,835. Patented Feb. 19, 1884.
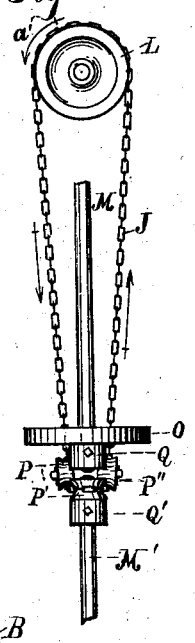
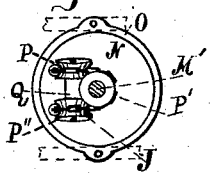
WITNESSES:
INVENTOR
Oswald E. Winger
by Robt. H. Wiles,
ATTORNEY

UNITED STATES PATENT OFFICE.

OSWALD E. WINGER, OF FREEPORT, ILLINOIS, ASSIGNOR OF ONE-HALF TO ELAM B. WINGER, OF SAME PLACE.

WINDMILL.

SPECIFICATION forming part of Letters Patent No. 292,825, dated February 19, 1884.

Application filed September 8, 1883. (No model.)

*To all whom it may concern:*

Be it known that I, OSWALD E. WINGER, a resident of Freeport, in the county of Stephenson and State of Illinois, have invented certain new and useful Improvements in Windmills; and I do hereby declare the following to be a full, clear, and exact description of the invention, such as will enable others skilled in the art to which it pertains to make and use the same.

My invention is an improvement in windmills of the class whose power is applied to the rotation of a vertical power-transmitting shaft, and which are known as "power" mills. Its object is to prevent the tendency of the wind-wheel to move or "walk" out of the wind under the influence of the resistance of the work to the rotation of the vertical shaft.

The invention is described, explained, and claimed in the following specification, and shown in the accompanying drawings, in which—

Figure 1 is a side elevation of the mill, the turn-table C and part of the plate N and ring O being shown in vertical section; Fig. 2, a front elevation of the chain belt J and parts connected immediately therewith, looking in the direction indicated by the arrow a, Fig. 1; and Fig. 3, a bottom view of the plate N and parts connected immediately therewith.

In these figures, A is a windmill-tower, of ordinary form; B, a plate forming the stationary top of the tower, and having a circular central opening; and C, the annular turn-table of the mill, revolving in the central opening of the plate B, the contiguous surfaces of the plate and turn-table being separated by a series of anti-friction balls, in the manner common to various forms of mills now in use. With the turn-table C is cast integrally a horizontal bearing, D, in which is journaled the shaft E of a wind-wheel, F, and on the inner end of the shaft E is rigidly mounted a chain-pulley, L. The wheel shown has no vane, but is held by the force of the wind in a position at the opposite side of the tower to that from which the wind blows, the direction of the wind when the mill is in the position shown in Fig. 1 being that indicated by the arrow a.

To the bearing D is rigidly fastened a vertical post, G, which supports a rigid horizontal bracket, H, lying preferably in the plane of the shaft E, but on the opposite side of the post G. In the bracket H is journaled the upper end of a shaft, M, which is coincident with the vertical axis of the mill, and to which is rigidly attached above the bracket H a vane, K, whose office is hereinafter explained.

To the lower end of the shaft M is rigidly attached a circular horizontal plate, N, which rotates freely in a ring, O, rigidly attached to the tower by means of cross-timbers. Below the plate N is rigidly fastened to the shaft M a block, Q, on the opposite sides of which are pivotally mounted two loose chain-pulleys, P P", and below the lower end of the shaft M is the vertical power-transmitting shaft M' of the mill, on whose upper end is rigidly mounted a chain-pulley, P'. An ordinary square chain, J, forms a band passing through holes in the plate N and around the pulley L of the wind-wheel shaft, the loose pulleys P P", and the pulley P' of the vertical shaft M'. The rotation of the wind-wheel in the direction indicated by the arrow a', Fig. 1, carries the chain J in the direction indicated by the arrows along its course in Figs. 1 and 2, and the motion of the chain rotates the pulley P' and shaft M' from left to right. It is evident that if no resistance be offered to the rotation of the shaft M' the vane K will stand in the line of the wind and in the vertical plane of the axis of the shaft E. As soon, however, as the mill has any work to perform, the resistance of the work will react upon the chain J, and through it upon the loose pulleys P P" and the block Q, to which they are attached, and this reaction will tend to move the block about the vertical axis of the mill in a direction opposite to the direction of rotation of the shaft M', or from right to left; but since the block Q, shaft M, and vane K are all rigidly connected any partial revolution of the block about the vertical axis of the mill is communicated directly to the vane, which is thus thrown into the wind. The angle to the line of the wind which the vane reaches depends, of course, on the degree of resistance offered by the work, and the vane will move into the wind until the force exerted upon its surface balances the reaction of the work on the shaft M', when it will become stationary and remain so as long as the work and wind remain constant. Upon any increase of the work or decrease in the wind the vane will move farther into the wind, while any decrease of the work or increase in the force of the wind will throw the vane back toward the vertical plane of the shaft E. In every position of the vane its resistance to the force of the wind balances the reaction of the work, and there is therefore no tendency of the wind-wheel to walk out of the wind in consequence of such reaction.

Having now described my invention, what I claim as new, and desire to secure by Letters Patent, is—

1. In a mill of the class described, the combination of the horizontal shaft of the wind-wheel, the vertical power-transmitting shaft of the mill, a band adapted to transmit the motion of the wind-wheel shaft to the vertical shaft, intermediate pulleys for changing the direction of said band, an independently-rotating vertical shaft to which said intermediate pulleys are attached, and a vane rigidly attached to said vertical shaft, substantially as shown and described, and for the purpose set forth.

2. The combination of the horizontal wind-wheel shaft E, the vertical power-transmitting shaft M', the independent vertical shaft M, and vane K thereto attached, the band J, connecting the shafts E M', and intermediate means, substantially as described, connecting said chain J and shaft M, whereby the reaction of the work performed by the mill operates to throw the vane K into the wind, substantially as shown and described, and for the purpose set forth.

3. The combination of the shafts E M', chain-pulleys L P', attached to said shafts, respectively, the vertical shaft M, block Q, rigidly attached thereto, and pulleys P P", pivoted to said block, and the chain J, passing around said pulleys L P P' P", and transmitting the motion of the shaft E to the shaft M', substantially as shown and described, and for the purpose set forth.

4. The combination of the turn-table C, bearing D, formed integrally therewith, vertical post G, rigidly attached to said bearing D, bracket H, rigidly attached to said post and vertically bored in the axial line of the mill, to serve as the bearing of the vertical shaft M, the shaft M, journaled and rotating in the bearing so formed, the vane K, rigidly attached to said shaft, and the pulleys P P", connected with said shaft, substantially as shown and described, and for the purpose set forth.

In testimony whereof I have signed this specification in the presence of two subscribing witnesses.

OSWALD E. WINGER.

Witnesses:
 A. W. GREENE,
 OSCAR TAYLOR.